March 22, 1955
E. B. HAMMOND, JR
2,704,456
GYRO PRECESSING MECHANISM
Filed March 1, 1946
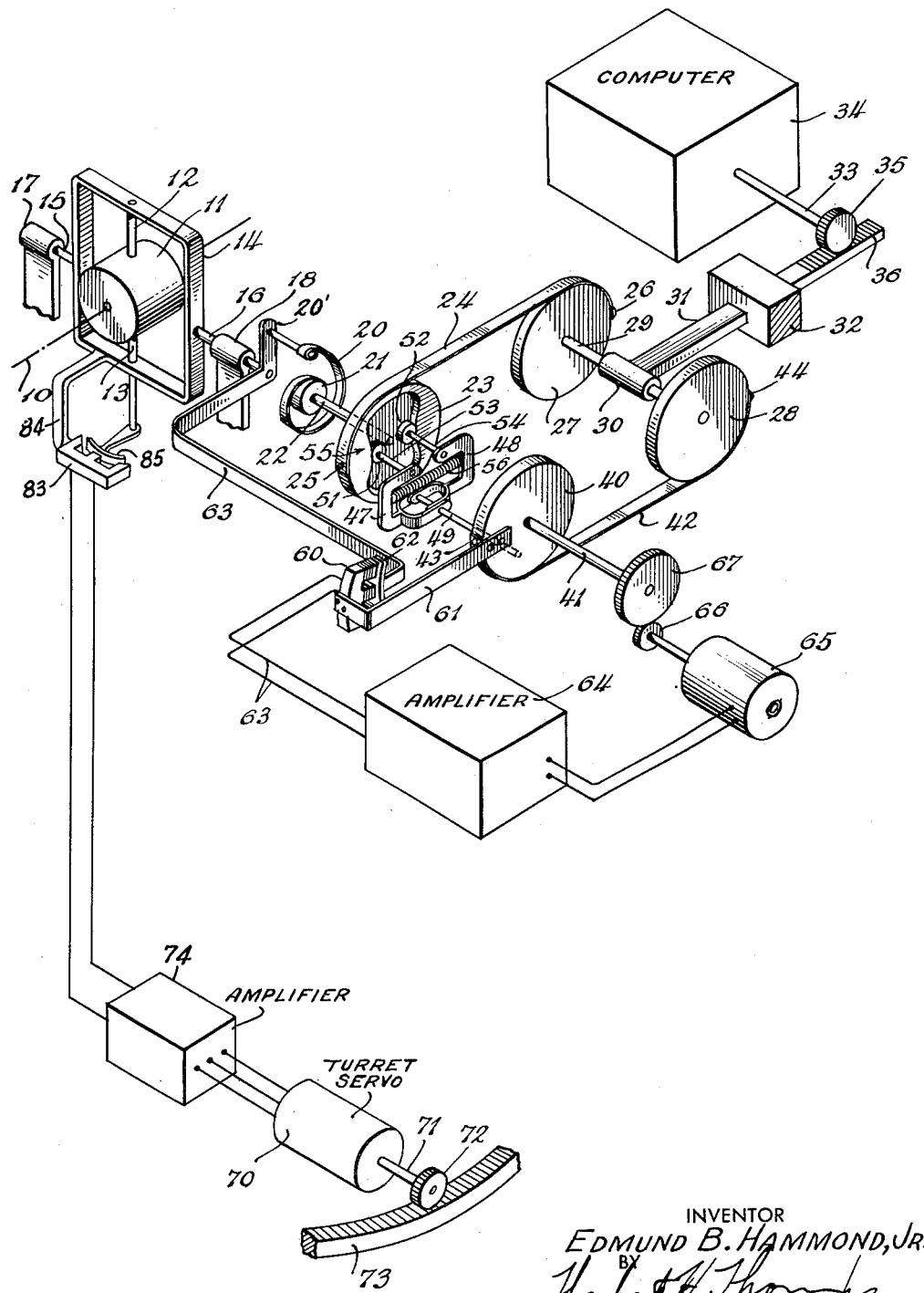
INVENTOR
EDMUND B. HAMMOND, JR.
BY
*Herbert H. Thompson*
ATTORNEY.

United States Patent Office 2,704,456
Patented Mar. 22, 1955

2,704,456

GYRO PRECESSING MECHANISM

Edmund B. Hammond, Jr., Floral Park, N. Y., assignor to The Sperry Corporation, a corporation of Delaware Application March 1, 1946, Serial No. 651,275

15 Claims. (Cl. 74—5.4)

This invention relates to a gyro precessing mechanism. In some gyro applications, particularly computing gun sights of the stabilized type, the precession rate of a gyro is used to provide data for a lead angle computer, and the same gyro is used, in the case of an airborne sight, to stabilize the gun or gun turret and/or the line of sight against roll or pitch of the supporting aircraft. Such gyros are frequently subject to displacement through rather large angles about their precession axes, and a feature of the present invention is the provision of a novel precession arrangement of simple construction for applying computed torques accurately to the axes of such gyros.

Another feature of the invention is the provision of a simple mechanism which constantly adjusts a precession spring to correct for the angular displacement of a gyro gimbal. Another feature of the invention is the provision of a differential device which while correctly adjusting the precession spring according to the movement of the computer axle does not allow said spring to apply torques to the gyro as a result of real tilting of the gyro about the torque axis, or as a result of an apparent tilting caused by rolling or other angular motion of the craft in which the gear is carried.

Still another feature of the invention is the provision of a simple torque amplifying device by which a low energy computer output is stepped up and transmitted to a precessing spring.

A further feature of the invention is the provision of a novel differential arrangement having low frictional losses and substantial freedom from backlash. The output of the differential is used to wind a precessing spring attached to an axis of a gyro. One input of the differential is power actuated, while the other input is driven from the output of the computer. The differential includes a novel mechanism for amplifying a low energy computer input to provide adequate power to wind the precession spring.

Other features will appear in the following description given with the aid of the accompanying drawing in which the single figure shows schematically a precessing mechanism according to a preferred form of the present invention.

Referring to the drawing, a gyro having a spin axis 10, is enclosed in a casing 11. The casing is supported on vertical pivots 12 and 13 within gimbal ring 14. The gimbal ring is supported for rotation about a horizontal axis by shafts 15 and 16 which turn respectively in bearings 17 and 18. The gyro structure is not fully shown as gyros per se are well known. The drawing shows the precessing mechanism of the present invention attached to the horizontal or elevation axis of the gyro. It will be understood that a duplicate precessing mechanism, not shown, may be provided for the azimuth or vertical axis of the gyro.

A spiral precessing spring 20 has one end connected to a crank 20' secured to gimbal pivot shaft 16. The opposite end of the spring is attached to a hub 21 fixed on shaft 22 concentrically disposed with respect to shaft 16 in a bearing, not shown. It will be understood that when the precessing torque is applied round the horizontal axis 15, 16, the precession of the gyro will take place round the normally vertical axis 12, 13. In most turret sights the turret itself is required to turn in azimuth so as to follow the gyro, and for this purpose a follow-up transformer 83 of the E type is carried on a bracket 84 fixed to the gimbal ring 14, while the follow-up armature 85 is carried on an extension of pivot 13. Since the axis 15, 16, is fixed relatively to the turret, the transformer 83 gives a signal whenever the turret is not aligned with gyro axis 10. Said signal, after amplification by amplifier 74, drives turret servo 70 which, by its shaft 71 and pinion 72 cooperates with rack 73 to align the turret with axis 10.

The rate of precession to be given to the gyro is governed by computer 34 which may be of the kind disclosed in the application of Edward J. Nagy and Edmund B. Hammond, Jr., Serial No. 563,068, filed November 11, 1944, now Patent 2,579,510. This computer rotates pinion 35 through an angle proportional to the required rate of precession.

At first sight it might appear sufficient to couple the output shaft 33 of the computer directly to shaft 22 so as to apply the precessing couple through spring 20 to the gyro. Such a construction would have several disadvantages which it is an object of the present invention to avoid. Among these disadvantages are first the fact that any rotation of the gyro round axis 15, 16 would stress spring 20 and cause unwanted precession about the azimuth axis. Secondly, the torque load on the output shaft 33 of the computer would vary with the stress given to spring 20, and at the higher values might vitiate the accuracy of the computer output; and thirdly, the load on the computer would pass through a zero value with change of sign causing errors due to backlash in the computer mechanism.

For these reasons, shaft 22 is not coupled to the computer direct, but is made as the output shaft for a differential mechanism, about to be described. Spring 20 is shown diagrammatically as a single spiral spring. In practice a pair of these springs may be used arranged side by side, the spirals being wound in opposite directions to provide a balanced arrangement. The differential mechanism referred to may be of any form having the usual three arms or members, that is, two opposite members and a middle or summation member. Because of certain advantages, I have shown a special type of differential mechanism using pulleys and flexible bands attached thereto instead of an ordinary differential gear arrangement, but it will be understood that in its broader aspects other forms of a differential mechanism may be employed if desired.

A pulley 23 is fastened to shaft 22 and may be regarded as the output member of the differential mechanism. A flat belt 24 of thin metal extending over the top of the pulley is fastened at one end to pulley 23 by pin 25. The opposite end of belt 24 is attached by pin 26 to the rear side of pulley 27 as shown in the drawing. Pulley 27 and an identical pulley 28 are both secured near opposite ends of shaft 29 that turns in a bearing 30 formed in a slide 31. The slide is movable in a support 32, under control of the output shaft 33 of a computer 34, the shaft 33 being coupled with the slide by a gear 35 which meshes with a rack 36 formed in the slide. The linear displacement of rack bar 31, which causes the lateral displacement of the shaft 29 carrying pulleys 27 and 28, constitutes the input to the middle member of my differential mechanism.

A pulley 40, constituting the second member of the differential mechanism is secured on a shaft 41 concentrically disposed with respect to shaft 22 in bearings, not shown. A belt 42 extending around the under surfaces of pulleys 28 and 40 has opposite ends respectively secured to these pulleys by pins 43 and 44. A pair of rocker arms 47 and 48 are pivoted on a rod 49 attached eccentrically to pulley 40. The eccentric mounting of shaft 49 is arranged so that the paths of the rollers 51 and 52 both pass through the middle points of the cam 55 which is also on the axis of shaft 22. Rollers 51 and 52 turn on shafts 53 and 54 respectively, said shafts being supported respectively on the rocker arms 47 and 48 which are pivoted on rod 49.

The rollers ride on opposite but corresponding portions of a cam 55 which is shown as being formed in one side of pulley 23. A compression spring 56 disposed between rocker arms 47 and 48 forces the rollers 51 and 52 against the surface of the cam. Because of the slopes of the working faces of the cam torques are produced between the cam and the rollers which tend to turn shaft 41 relatively to shaft 22. The shape of the cam is so designed that if $\phi$ be the angle of relative rotation between shaft 41 and shaft 22 this torque will be equal to $A\phi$. The stiffness of the spring 20 is such that if $\phi$ be the angular displacement of shaft 22 relatively to shaft 16 the torque applied by the spring to shaft 22 will be $-A\phi$.

A pick-off transformer 60 is supported by an arm 61 fastened to pulley 40. An armature 62 for the transformer is supported by an arm 63 secured to the gimbal pivot shaft 16. The pick-off transformer 60 is connected by leads 63 to the input of amplifier 64 which controls in the usual manner a servomotor 65. The servomotor is shown as having a gear 66 on its shaft in mesh with gear 67 on shaft 41 on which pulley 40 is secured. The amplifier-servo mechanism just described amounts to a simple follow-up system which can be considered effective to maintain transformer 60 in register with its armature 62.

Referring to the drawing, it can be seen that with the exception of negligible frictional or inertial torques the only torques acting on cam 55 and pulley 23 are due to the spiral precessing spring 20, the compression spring 56 through the action of rollers 51 and 52 on cam 55, and the tension of belt 24. In normal operation the pick-up transformer 60 and servomotor 65 will insure that shaft 41 and shaft 16 turn together so that pickup arm 61 and crank 20' are maintained in constant angular relation. If shaft 22, which carries the precession spring 20 at one end, and the cam 55 at the other is rotated by the pull of belt 24 it will rotate equally with respect to crank 20' and rollers 51 and 52.

Let the angle of this rotation be called $\phi$, $\phi$ being zero when the gimbal axis 12 is vertical and spring 20 is unstrained. Then spring 20 is so proportioned that the torque it applies to the gyro is $A\phi$, and the simultaneous reaction on shaft 22 is $-A\phi$.

The pulley 23 and cam 55 are fixed on shaft 22 with an angular offset counterclockwise so that when $\phi$ is zero as defined hereinbefore, the rollers 51 and 52 are not at the zero position of the cam, or at the narrowest portion of the waist thereof but are displaced by an angle $\theta$ from that zero position. Under these conditions compression spring 56, through rollers 51, 52, and the sloping faces of cam 55 applies a counterclockwise torque, $A\theta$ to shaft 22, while at the same time precession spring 20 is unstressed, and applies zero torque to both the gyro and shaft 22. The torque $A\theta$ is thus opposed by the pull of belt 24 which is in tension. This is the normal or zero condition of the apparatus.

Now, if the computer operates to rotate shaft 22 by pulling through rack 36 and belt 24 on pulley 23, so as to rotate shaft 22 through an angle $\phi$, the torque on shaft 22, due to precession spring 20 will be $-A\phi$, and the torque due to the cam 55 will be $A(\phi+\theta)$. The sum of these two torques, which is the torque available at pulley 23 to pull on belt 24, will be $A\theta$, which is constant, and independent of both the magnitude and sign of the variable angle $\phi$. Consequently, the tension in belts 24 and 42 is constant and the loads on the rack 36, pinion 35 and computer 34 are also constant and unidirectional so that there is no backlash.

At the same time, the torque applied by spring 20 to precess the gyro will be proportional to $\phi$, the angle of rotation given to shaft 22, the energy required to provide this varying torque being derived from servomotor 65.

Assume now that through rolling of the craft or tilting of the gyro, there is relative motion about shaft 16 of the gyro and gimbal ring 14 with respect to the rest of the apparatus. This will cause pickoff armature 62 to be displaced relatively to the transformer 60 causing amplifier 64 to operate servo 65 which will turn pulley 40 in such a direction as to maintain transformer 60 closely in register with its armature 62. Consequently, pulley 40 will turn through an angle equal to the angular movement of the gyro around shaft 16. Rotation of pulley 40, through belt 42, pulley 28, pulley 27 and belt 24, will rotate pulley 23 and shaft 22 through the same angle as the tilting angle of the gyro around shaft 16 because all four pulleys are the same size. Consequently, although the tilting of the gyro rotates crank 20' and the outer end of spring 20, the follow-up device causes an equal rotation of shaft 22 and the inner end of spring 20 so that no torque is applied by the spring to the gyro as a result of its apparent tilt around axis 16. During this operation the belts 24 and 42 are continually in tension because of the constant torque on pulley 23 as hereinbefore described. Consequently, rotation of pulley 40 either to right or left will cause equal rotation of pulley 23 in the same sense as the rotation of pulley 40 and there is no necessity for the belts to make a complete circuit around the pairs of pulleys. The load on the computer pinion 35 as given by the rack 36 is equal to the sum of the tensions in belts 24 and 42.

When the output shaft 33 of the computer rotates it causes the rack to slide through the block 32 and moves the pair of pulleys 27 and 28 towards or away from the shafts 22 and 41. Assuming that the gyro pivot axis 12, 13 remains vertical, pulley 40 will be locked by servomotor 64 in the position where the pickoff transformer 60 faces its armature 62. Sliding of the rack 31 will then have the effect of rotating pulley 23, shaft 22 and the hub 21 of the precession spring 20 through an angle proportional to the angle of rotation of shaft 33. This will apply a proportional torque to the gyro through crank 20' and gimbal ring 14 and cause the necessary precession in azimuth around the axis 12, 13. When this takes place the rollers 51 and 52 will apply a torque through the cam surfaces to pulley 23. The direction of said torque being such as to assist or reinforce the drive from the computer so that in spite of the extra torque required to wind or unwind spring 20 the tension in the belts 24 and 42 will not be varied.

The constant tension in belts 24 and 42 assures correct operation of the mechanism for movement of the rack 31 in either direction and also takes up any backlash that may exist between the teeth of pinion 35 and the teeth 36 of the rack and also takes up any backlash that there may be in the computer itself.

Since the present invention relates to a precessing mechanism, it is not thought necessary to show and describe in detail a more complete gyro apparatus, or a sighting or computing device in which a gyro is utilized, as such devices generally are well known.

It will be understood that the invention is not intended to be limited to the specific pulley and belt arrangement disclosed for, clearly, in some applications, equivalent means such as chain and sprocket means could be substituted therefor. The form of the invention here shown is illustrative only and various modifications thereof will suggest themselves to those skilled in the art, without departing from the spirit of the invention or the scope of the appended claims.

What is claimed is:

1. A differential mechanism comprising an output member, a cam approximately symmetrical in shape fixed to said member, its second or input member displaceable from a neutral position with respect to the output member, a pair of levers pivotally attached to the input member, a roller mounted on each lever disposed on corresponding parts of the cam, spring means effective to press the rollers against the surface of the cam, the cam being so laid out that the rollers exert torques effective on the output member in proportion to the relative displacement of the members, a third or middle member, and a computer input for moving said member.

2. A differential mechanism comprising an input pulley, a relatively displaceable output pulley, a cam fixed to the output pulley, roller means carried by the input pulley yieldingly urged against the surface of the cam, the cam contour being such that the rollers exert a torque on the output pulley in proportion to the relative displacement of the pulleys from a neutral position, a movable input member, pulley means supported thereby alongside said pulleys in spaced relation thereto, and means coupling said pulleys with the pulley means effective to cause relative displacement thereof in accordance with the movements of the input member.

3. A differential mechanism comprising an input pulley, a relatively displaceable output pulley, a cam fixed to the output pulley, roller means supported by the input pulley yieldingly urged against the surface of the cam, the cam contour being such that the rollers exert a torque on the output pulley in proportion to the relative displacement of the pulleys, a movable input member, pulley means supported for rotation thereby, and flexible belt means coupling the pulleys respectively with the pulley means effective on the moving of the input member to cause relative displacement of the pulleys.

4. A differential mechanism comprising an input pulley, a relatively displaceable output pulley, a cam fixed to the output pulley, roller means supported by the input pulley yieldingly urged against the surface of the cam, the cam contour being such that the rollers exert a torque on the output pulley in proportion to the relative displacement of the pulleys, a movable input member, a shaft supported thereby for rotation in parallel relation to the axes of said pulleys, a pair of pulleys fixed to the shaft respectively aligned with the input and output pulleys, and a pair of belts fastened respectively to the input and the output pulleys and to the respective pulley of the pair aligned therewith effective to cause relative displacement of the input and output pulleys in accordance with the displacement of the movable input member.

5. A differential mechanism comprising an input pulley, a relatively displaceable coaxially disposed output pulley, a shaft disposed in parallel relation with the axes of the pulleys supported for variable spacing therefrom, a pair of pulleys associated respectively with the input and output pulleys secured to the shaft, a belt for each of the input and output pulleys oppositely attached thereto and to the pulley of the pair associated therewith, cam and roller means yieldingly connecting the input and output pulleys effective to exert a torque on the output pulley in proportion to the relative angular displacement of the pulleys connected thereby, and an input member attached to the shaft for changing the spacing thereof with respect to the axes of the first mentioned pulleys and thereby varying the relative displacement of the input and output pulleys.

6. A differential mechanism for applying precessing torques to the gimbal frame of a gyro about an axis thereof which comprises an output member, a precessing spring connected between the output member and gimbal frame, an input member angularly displaceable with respect to the output member, cam and cooperating cam roller means yieldingly coupling the input and output members effective to apply torques through the output member to oppose torques otherwise exerted by the precessing spring on the third member in accordance with the relative angular displacement of the members, a third member effective to vary the relative angular displacement of the other members thereby modifying the torque applied to the precessing spring and means for maintaining the second member in predetermined angular relation with respect to the gimbal frame to compensate the precessing spring for angular displacement of the gimbal frame about said axis.

7. A differential mechanism for applying precessing torques to the gimbal frame of a gyro about an axis thereof which comprises an output member, a precessing spring connected between the output member and gimbal frame, an input member angularly displaceable with respect to the output member, cam and cooperating cam roller means yieldingly coupling the input and output members effective to apply torques through the output member on the precessing spring in accordance with the relative angular displacement of the members, means for maintaining the input member in predetermined angular relation with respect to the gimbal frame to compensate the spring for rotation of the gimbal frame about said axis, a third member cooperating with the cam and cam roller means for displacing the output member with respect to the input member, irrespective of the angular position of the latter member, to apply torques to the precessing spring.

8. A differential mechanism for applying precessing torques to the gimbal frame of a gyro about an axis thereof which comprises an output member, a precessing spring connected between the output member and gimbal frame, an input member angularly displaceable with respect to the output member, cam and cooperating cam roller means yieldingly coupling the input and output members effective to apply counteracting torques on the output member to the precessing spring in accordance with the relative angular displacement of the members, a pair of cooperating pickoff members, one being fixed to the gimbal frame and the other fixed with respect to the input member, circuits controlled by the pickoff members including means for maintaining the input member in predetermined angular relation with the gimbal frame to compensate the precessing spring for rotation of the gimbal frame about its axis, and input means cooperating with the cam and roller means for angularly displacing the output member with respect to the input member to apply precessing torques to the precessing spring.

9. A differential mechanism for applying precessing torques to the gimbal frame of a gyro about an axis thereof which comprises an output pulley, a precessing spring connected between the output pulley and gimbal frame, an input pulley angularly displaceable with respect to the output pulley, cam and cooperating cam roller means yieldingly coupling the input and output pulleys effective to apply torques through the output pulley on the precessing spring in accordance with the relative angular displacement of the pulleys, a pair of cooperating pickoff members, one being fixed to the gimbal frame and the other fixed with respect to the input pulley, servomotor means controlled by the pickoff members effective to maintain the input pulley in predetermined angular relation with the gimbal frame to compensate the precessing spring for rotation of the gimbal frame about its axis, and input means cooperating with the cam and roller means for angularly displacing the output pulley to apply precessing torques to the precessing spring.

10. A differential mechanism for applying precessing torques to the gimbal frame of a gyro about a precession axis thereof which comprises an output pulley, a precessing spring connected between the output pulley and gimbal frame, an input pulley angularly displaceable with respect to the output pulley, cam and cooperating roller means yieldingly coupling the input and output pulleys effective to apply torques through the output pulley on the precessing spring in accordance with the relative angular displacement of the pulleys, a pair of cooperating pickoff members, one being fixed to the gimbal frame and the other fixed with respect to the input pulley, servomotor means controlled by the pickoff members effective to maintain the input pulley in predetermined angular relation with the gimbal frame, pulley means disposed alongside the input and output pulleys, belt means secured thereto and oppositely connected to the input and output pulleys effective to displace the output pulley in the same direction as the input pulley, and input means effective to control the magnitude of this displacement of the output pulley and the resulting torque for the precessing spring.

11. A differential mechanism for applying precessing torques to the gimbal frame of a gyro effective about a precession axis thereof which comprises an output pulley, a precessing spring connected between the output pulley and gimbal frame, an input pulley angularly displaceable with respect to the output pulley, a cam fixed to the output pulley, roller means supported by the input pulley, spring means pressing the roller means against the surface of the cam, the cam being so laid out that the rollers exert a torque thereon in accordance with the relative displacement of the pulleys, a pair of cooperating pickoff members, one being fixed to the gimbal frame and the other fixed with respect to the input pulley, servomotor means controlled by the pickoff members effective to maintain the input pulley in predetermined angular relation with the gimbal frame, pulley means disposed alongside the input and output pulleys, belt means secured thereto and oppositely connected to the input and output pulleys, for displacing the output pulley in the same direction as the input pulley, and input means effective to control the magnitude of this displacement and thereby the torque applied to the precessing spring.

12. A differential mechanism for applying precessing torques to the gimbal frame of a gyro effective about a precession axis thereof which comprises an output pulley, a cam approximately symmetrical in shape fixed to the output pulley, an input pulley displaceable in either direction from a neutral position with respect to the output pulley, a pair of arms pivotally attached to the input pulley, a roller mounted on each arm disposed on corresponding parts of the cam, spring means effective to press the rollers against the surface of the cam, the cam being so laid out that the rollers exert a torque effective on the output pulley and precessing spring in proportion to the relative displacement of the pulleys, a pair of cooperating pickoff members, one being fixed to the gimbal frame and the other fixed with respect to the input pulley, servomotor means controlled by the pickoff members effective to maintain the input pulley in predetermined angular relation with the gimbal frame, pulley means disposed alongside the input and output pulleys, belt means secured thereto and oppositely connected to the input and output pulleys, for displacing the output pulley in the same direction as the input pulley, and input means effective to control the magnitude of this displacement and thereby the torque applied to the precessing spring.

13. In a gyro controlled fire control system, the combination with a free gyro and a variable tension spring for applying control torques thereto from a computer; of a differential mechanism for relieving the computer of the torque, otherwise due to said spring, comprising an output member connected to one end of said spring, a relatively displaceable input member, means comprising a cam and roller device interconnecting said members for applying a torque and in opposition to said spring, and proportional to the relative displacement of said members to modify the relative displacement of said members, said computer being connected to the third member of the differential mechanism whereby tension on the controlling spring is prevented from reaching the computer.

14. A gyro controlled fire control system, as claimed in claim 13, having a follow-up connection between the second member or input of said differential, said gyro and said spring.

15. A compensated differential mechanism for applying control torques to a precessing spring attached to an axis of a gyro, uninfluenced by tilting of the gyro support, which comprises, a three member differential, one member of which is attached to said precessing spring, a relatively displaceable power driven member, cam and roller means yieldingly connecting said members effective to apply a torque between the members opposing the precessing spring in proportion to the relative displacement of the members, and a controlled input for the third member of the differential effective on displacement to modify the relationship between said first two members.

No references cited.